United States Patent [19]

McFarland

[11] Patent Number: 4,618,114
[45] Date of Patent: Oct. 21, 1986

[54] CONDUIT SPACER AND SUPPORT

[75] Inventor: James H. McFarland, Leonard, Mich.

[73] Assignee: LOF Plastics Inc., Troy, Mich.

[21] Appl. No.: 709,999

[22] Filed: Mar. 13, 1985

Related U.S. Application Data

[63] Continuation of Ser. No. 426,935, Sep. 29, 1982.

[51] Int. Cl.⁴ ............................................. F16L 3/08
[52] U.S. Cl. ..................................... 248/65; 248/68.1; 248/73; 248/74.2; 248/221.4
[58] Field of Search .................. 248/68.1, 65, 69, 71, 248/72, 73, 221.3, 221.4, 74.1, 74.2

[56] References Cited

U.S. PATENT DOCUMENTS

| | | | |
|---|---|---|---|
| 1,352,895 | 9/1920 | Hoffman | 248/72 |
| 2,340,249 | 1/1944 | Murphy | 248/68 R |
| 3,154,281 | 10/1964 | Frank | 248/71 X |
| 3,778,537 | 12/1973 | Miller | 248/74 A |
| 3,856,246 | 12/1974 | Sinko | 248/68 CB |
| 3,991,960 | 11/1976 | Tanaka | 248/73 X |
| 4,112,815 | 9/1978 | Tanaka | 248/73 X |
| 4,143,577 | 3/1979 | Eberhardt | 248/71 X |
| 4,306,697 | 12/1981 | Mathews | 248/68 CB |
| 4,371,137 | 2/1983 | Anscher | 248/73 |

Primary Examiner—J. Franklin Foss
Assistant Examiner—David L. Talbott
Attorney, Agent, or Firm—Phillip S. Oberlin

[57] ABSTRACT

A conduit system for supporting and clamping a bank of conduits of different diameters in a substantially parallel and spaced apart relationship which requires a minimum number of parts and which can be assembled simply and rapidly. The basic structure is comprised of a plurality of vertically and horizontally interlocking modular units, each consisting of a frame member having at least one side thereof including an arcuate surface corresponding to the outside diameter of a first conduit. The conduit is supported on the arcuate surface of one frame member and clamped thereon by a second, superimposed, interlocking frame member. A unitary generally U-shaped adapter is employed to support a smaller diameter conduit within the system. One end of the adapter includes a snap-on clip to facilitate attachment to an arcuate surface of a frame member and the opposite end comprises a pair of opposed resilient arms for receiving and holding the smaller conduit in a fixed relationship to the arcuate surface.

5 Claims, 4 Drawing Figures

CONDUIT SPACER AND SUPPORT

This application is a continuation, of application Ser. No. 426,935, filed Sept. 29, 1982.

BACKGROUND OF THE INVENTION

The invention relates generally to a conduit spacer and clamp system for supporting a bank of conduits and, more particularly, to an improved system for supporting a plurality of conduits of different diameters in parallel, spaced relationship using a minimum number of parts.

Conduit spacers are commonly used for supporting a bank of conduits or pipes which may convey fluids or contain electrical power and/or telephone lines. Generally speaking, a plurality of interlocking conduit spacer members combine to form an assembly or system for securely holding conduits in parallel, spaced relationship for reasons to be set forth below. As mentioned, the conduits may be used for carrying electrical lines, and in such installation it is required to maintain minimum spacing between adjacent conduits to insure that the electrical fields do not interfere with each other. Furthermore, the conduits are normally installed in a trench below ground level and subsequently covered with an appropriate filling material such as sand, gravel, or concrete. In such application, it is essential during the filling operation that the conduits be provided with appropriate supporting means to prevent displacement and possible fracture of the conduits and also that they be maintained in a parallel, spaced relationship to permit free flow of the material around the conduits to insure complete encasement thereof.

In many installations it has been advantageous to include different sized conduits, i.e., conduits with different size diameters, within the same system. Various conduit spacers have been developed to effectively maintain separation and support of conduits in a system, although most have been designed for use with only one size conduit. Generally, it is not possible to interconnect the parts used for supporting one size conduit with those of another. Thus, if there is a need to install a conduit, e.g., of small diameter, in a spacer system for supporting large diameter conduits, it is necessary to tie or wire the smaller conduit to the larger spacer, which is time-consuming, therefore adding to the cost of the installation. There have been systems developed to accommodate different size conduits that have worked well but, unfortunately, they require several different parts and thus are time-consuming and difficult to assemble. For the sake of efficiency and economy, it is desirable that the conduit system utilize a minimum number of parts, be made of lightweight, low cost, inert material, and be of a design which is easy to assemble with a minimum of skill.

SUMMARY OF THE INVENTION

In accordance with the present invention, there is provided a modular conduit spacer system for supporting conduits of different sizes in parallel, spaced relationship that overcomes all of the above-noted shortcomings. The present invention requires a combination of only two standard interlocking modular units and a unitary adapter clamp to form the entire system. The two units which make up the basic structure consist of a base member and what is referred to in the art as an intermediate member. The members have complementary, opposed arcuate surfaces that engage opposite sides of a conduit and are maintained in clamping engagement therewith by cooperating interlocking means provided on each member. Both units also include appropriate side interlocking means whereby adjacent units may be connected together. Thus, any number of these modular units may be assembled together as needed, to form the basic structure of the system. A conduit of smaller diameter may be integrated into the system by means of the novel adapter clamp or conduit holder of the present invention. The unitary adapter includes a U-shaped body for receiving and clamping a smaller size conduit, and a base with a snap-on clip for detachably securing the adapter to an arcuate surface of one of the modular units. It can be readily appreciated that the adapter may be used in a wide variety of spacer systems that incorporate conduit holders with arcuate support surfaces.

Therefore, it is a primary object of the present invention to provide a novel conduit holder that may be detachably secured to an arcuate surface.

Another object of the invention is to provide such a holder that is of one piece construction and which is quick and easy to install.

Another object of the invention is to provide a modular conduit spacer system for supporting a plurality of conduits of different sizes in parallel, spaced relationship.

Still another object of the invention is to provide such a system using a minimum number of parts, which are of lightweight construction, self-supporting, and easy to assemble by relatively unskilled labor.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE INVENTION

Figure 1:
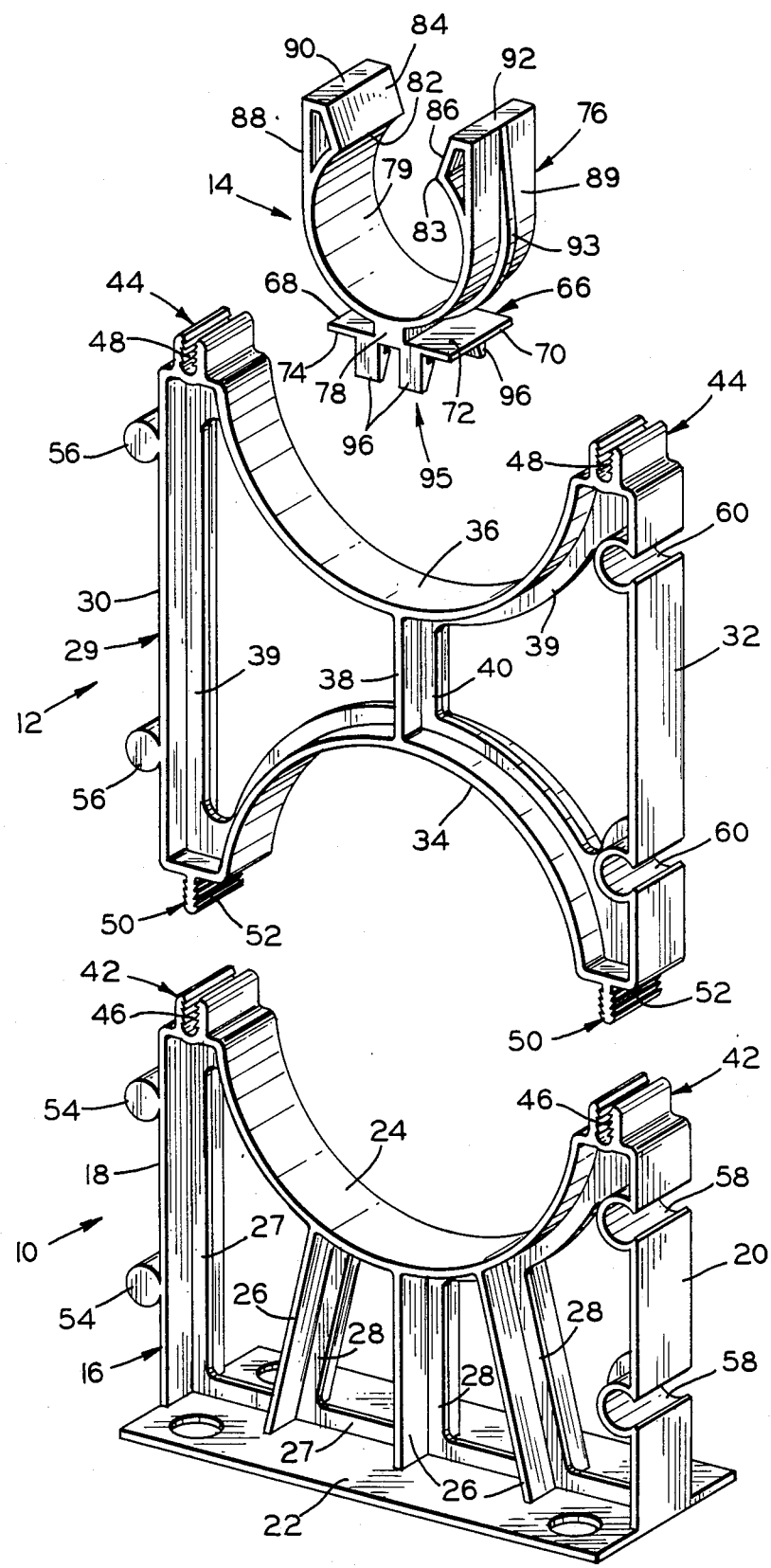
FIG. 1 is an exploded perspective view of the component parts of the modular conduit spacer system of the invention.

Referring now more particularly to the drawings, there is illustrated in FIG. 1 the components of the conduit spacer system of the invention consisting of a modular base unit 10, a modular intermediate unit 12, and an adapter clamp 14. Although the system will be described with reference to conduits, it is understood by those skilled in the art that pipes may be similarly supported and spaced in the same manner as are conduits. Therefore, the term conduit as used herein and in the claims is understood to include pipes, ducts and other tubular constructions as well as conduits. The modular units 10 and 12 may be assembled and interlocked together, as will be explained hereinafter, to form appropriate support and clamping means for a plurality of conduits of the same diameter. It will also be appreciated that any number of these units may be combined to make up the basic structure of the system. The adapter 14 is designed for supporting a smaller diameter conduit and is detachably securd to either of the modular units 10 or 12 as needed. The modular units and adapter clamp are preferably made of a molded, somewhat resilient plastic material, either a thermoplastic or a thermoset polymer resin, such as, for example, high impact styrene resin, ABS resin (acrylonitile-butadiene-styrene), polyvinylchloride, polyolefins, e.g., polypropylene, etc.

The modular base unit 10 is in the form of an open, generally rectangular frame 16 having two substantially parallel and upright sides 18 and 20 joined at their lower ends by an enlarged planar base 22. Opposite the planar base 22 is an inwardly recessed, arcuate side 24 which forms a surface or saddle for receiving a conduit to be supported thereby. The arcuate side 24 is sized and shaped to receive a given diameter conduit and is of suitable thickness and width to provide sufficient strength and support thereto. A plurality of post members or struts 26, three in number in the example illustrated, extend between the side 24 and the planar base 22 for added strength and support. Projecting inwardly from the perimeter of frame member 16 is a continuous central reinforcing rib 27 which merges with ribs 28 formed on opposite surfaces of each strut 26. The modular unit 10 thus provides a substantially rigid and strong open frame made of a lightweight material which can be readily surrounded by earth or poured concrete, for the reasons hereinbefore mentioned.

The modular intermediate unit 12, like base member 10, is also in the form of an open, generally rectangular frame 29 to insure uninhibited flow of filling material therethrough. The frame is provided with two substantially parallel and upright sides 30 and 32 which are joined at their opposite ends by inwardly recessed, symmetrically disposed, arcuate sides 34 and 36. These sides form surfaces sized and shaped to receive a conduit of given diameter and are of a suitable thickness and width to provide strength and support thereto. A post member or strut 38, intermediate sides 30 and 32 and parallel thereto, extends between arcuate sides 34 and 36 to provide increased support for superimposed tiers of conduits to be supported by the intermediate modular unit 12. A continuous central reinforcing rib 39 projecting inwardly from the perimeter of frame member 29, merges with ribs 40 formed on strut member 38 for added strength and rigidity.

Figure 2:
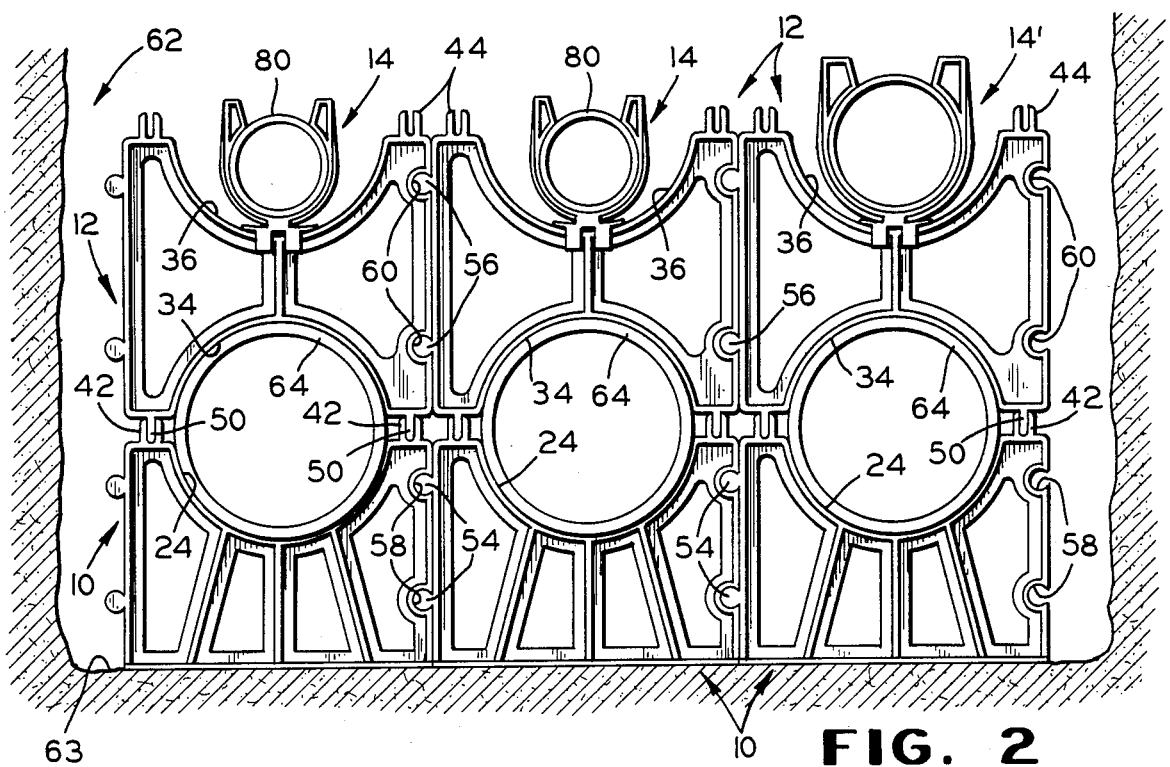
FIG. 2 is a front elevational view of the conduit spacer system assembled below ground level.

As previously mentioned, the modular units 10 and 12 include cooperating interlocking means, which upon assembly, provide a positive locking engagement therebetween. The interlocking means, although not restricted thereto, can be of the type disclosed and claimed in U.S. Pat. No. 3,856,246, which is incorporated herein by reference. Briefly, as illustrated in FIGS. 1 and 2, there is provided adjacent opposite ends of each arcuate side 24 and 36, a pair of elongated bifurcated lugs 42 and 44, respectively. The inner surfaces of the bifurcated lugs 42 and 44 include a series of parallel, transversely oriented wedge-like projections, designated respectively at 46 and 48. Additionally, there is provided adjacent opposite ends of arcuate side 34 of intermediate unit 12, a pair of elongated prong members 50 each having on opposite sides thereof, a series of parallel, transversely oriented wedge-like projections 52, complementary to the wedge-like projections 46 and 48.

It can thus be seen that when assembling the modular units 10 and 12 together, the prongs 50 with projections 52 will be forceably inserted between the inner surfaces of the bifurcated lugs 42 and associated projections 46 in interlocking engagement therewith. Once the modular units are interconnected in this manner, they cannot be separated by forces exerted in opposite directions and in the plane of the drawing, i.e., substantially perpendicular to the axis of the conduit supported therebetween. However, if so desired, they may be disconnected by sliding one relatively to the other in opposite directions substantially parallel to the axis of the conduit supported thereby.

It is readily understood that a plurality of intermediate modular units 12 may be properly interconnected one above the other by the means just described to provide complementary saddle-like surfaces for supporting conduits in vertically spaced, parallel arrangement. The top conduit of a row may be disposed so as to be freely supported by the arcuate surface 36 of the last intermediate unit 12 if so desired, or, preferably, the conduit may be securely clamped in position by another intermediate unit 12 or a base unit 10 (e.g., with the addition of adapter prongs as disclosed in the aforementioned U.S. Pat. No. 3,856,246) to prevent the conduit from floating during the burial thereof.

Although the modular base unit 10 has been shown provided with bifurcated lugs 42 at the two upper corners for interlocking with the prong member 50 of the modular intermediate unit 12, it is obvious that such an arrangement could be reversed or, alternately, that the base unit 10 be provided at each upper corner with a lug 42 and a prong member 50 and that the intermediate unit 12 have disposed on diagonally opposite corners thereof, lugs 42 and prong members 50, respectively.

The modular units 10 and 12 are also provided with lateral connecting means to interlock the modules in a side-by-side or horizontal arrangement. To this end, side 18 of base unit 10 and side 30 of intermediate unit 12 have a pair of spaced, generally cylindrical tongue portions 54 and 56, respectively. In addition, the opposite side 20 of base unit 10 and the opposite side 32 of intermediate unit 12 is provided with a pair of similarly spaced cylindrical grooves 58 and 60, respectively, which are adapted to receive respective tongue members 54 and 56 on adjoining modular units.

Thus, a bank of properly spaced and parallel conduits of a given diameter may be built up using the modular units 10 and 12 to form the basic structure of the system. To this end, a plurality of predetermined size base units 10 which correspond to the diameter of the conduit to be supported are first interconnected side-by-side on the ground or, as shown in FIG. 2, in a trench 62 by tongue and groove means 54 and 58. Parallel rows of the interconnected base units 10 are arranged at spaced intervals along the bottom of the trench 63, and a number of conduits 64 are disposed such as to be supported above the ground at axially spaced points along the length of the trench 63 on the saddle surfaces formed by the arcuate sides 24 of the base units 10. A like plurality of intermediate units 12 are then interconnected by tongue and groove means 56 and 60, and each row is clamped over the conduits, onto a row of base units 10 by the interlocking engagement between prongs 50 and bifurcated lugs 42. Although only one row of horizontally disposed conduits 64 is illustrated in FIG. 2, it is apparent that in like manner, several rows or partial rows of conduits of the same diameter may be superimposed in proper vertical and lateral spacing and in substantially parallel alignment.

As was previously mentioned, it is often advantageous to include different diameter conduits within the same system. Although there are some systems known in the industry which will accommodate conduits of different diameter, they are either difficult or inconvenient to install, e.g., threading a spacer over the end of a conduit, or they contain several parts which are time-consuming to assemble adding considerably to the cost thereof.

In accordance with the present invention, there is provided as best shown in FIG. 1, a U-shaped adapter clamp or conduit holder 14 of one piece construction that can be readily attached to any one of the arcuate surfaces of modular units 10 and 12. The adapter 14 is molded of a resilient, plastic material and includes a flexible planar base member 66 having novel means which permits the easy and secure attachment thereof to concave arcuate surfaces of various radii and thicknesses. The base 66 as viewed in FIG. 1 is of a generally rectangular, elongated configuration having opposite ends 68 and 70 and including upper and lower surfaces, 72 and 74, respectively. Although the base is shown and described as being rectangular, it is to be understood that it may be of another configuration, with the only requirement being that it be of sufficient length to meet the needs of the invention, which will be more fully hereinafter explained. In this same connection, the base 66 may be tapered in thickness, being thinner adjacent the ends 68 and 70 than at the center portion. As used herein, the terms upper, lower, top, bottom, and the like, are applied only for the convenience of description with reference to the drawings and should not be taken as limiting the scope of the invention.

The adapter 14 also includes a resilient, generally U-shaped body 76 having its open end extending outwardly away from the upper surface 72 of the base member 66 and its opposite, closed end integrally joined to the base member by a transversely disposed web portion 78 intermediate opposite ends 68 and 70. The axis of the U-shaped body 76 lies in a plane parallel to the base member 66 and is normal to the longitudinal direction thereof.

The inner configuration of the U-shaped body 76, i.e., the conduit engaging surface 79 (FIG. 3), is generally circular in shape having a diameter approximately equal to the outside diameter of a conduit 80 to be supported thereby, with the spacing between the open ends 82 and 83 being less than the outside diameter of the conduit 80. The width of surface 79 is sufficient to provide suitable bearing support for the conduit to be supported thereby. Extending upwardly and outwardly from the open ends 82 and 83 and integral therewith are angular walls or cams 84 and 86, respectively. The angular walls 84 and 86 are integrally connected to opposite side walls or arms 88 and 89 of the U-shaped body 76 by top walls 90 and 92, respectively. Projecting radially outwardly from the body 76, as best shown in FIG. 3, is an integral, central reinforcing rib 93 for increased strength and rigidity.

As mentioned above, the U-shaped body 76 is made of a resilient material. Thus it can be readily appreciated that as the conduit 80 is inserted into the open end of body member 76, the sides thereof will engage the angular walls or cams 84 and 86 urging them outwardly together with arms 88 and 89 to permit passing of the conduit therebetween and into engagement with surface 79. As the widest (diameter) portion of the conduit 80 passes through the innermost ends 82 and 83, the arms 88 and 89 return to their natural position, firmly capturing the conduit within the U-shaped body 76. It should be understood that the angular disposition of integral members 84, 90 and 88 on one side and 86, 92 and 89 on the other side, together with rib 93, provides sufficient rigidity to the body member 76 to maintain surface 79 in a clamping engagement with the conduit 80. This prevents the conduit from floating out of the body member 76 when being encased with concrete or other filling material in a trench.

A significant feature of the present invention is the provision of a snap-on clip, generally designated 95, that permits easy and secure attachment of adapter clamp 14 to any of the arcuate surfaces 24, 34 and 36 of modular units 10 and 12. As will be explained, not only can the novel clip be attached to various diameter arcuate surfaces of the units 10 and 12, they can be readily attached to the arcuate surfaces of a wide variety of spacer systems used in the industry.

Figure 3:
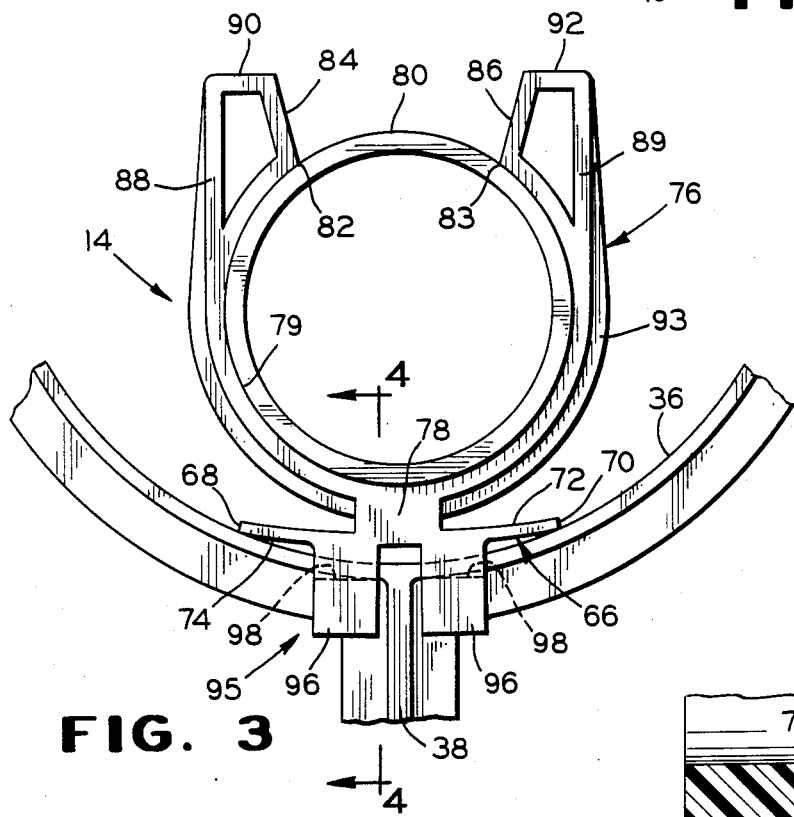
FIG. 3 is an enlarged, fragmentary elevational view of the spacer adapter clamp with a conduit supported thereby, mounted on the arcuate surface of a conduit spacer.
Figure 4:
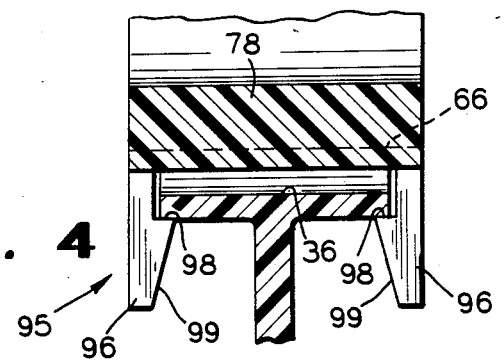
FIG. 4 is an enlarged, fragmentary sectional view taken substantially along the line 4—4 of FIG. 3 with the conduit removed.

Referring to FIGS. 1, 3 and 4, the flexible base member 66 which is a vital part of the unique snap-on clip 95 and depending from opposite longitudinal sides thereof, two pairs of opposed, centrally located, resilient legs 96. As illustrated in FIG. 4, the opposed legs 96 of each pair (only one pair being shown) have inner surfaces formed with inwardly directed shoulders 98 and include diverging cam surfaces 99 which extend downwardly from shoulders 98, i.e., away from base member 66. The clip is designed so that the distance between the innermost reach of each pair of opposed shoulders is less than the width of the arcuate surface on which the clip will be supported, and the distance between the shoulders and the base 66 is greater than the thickness of the arcuate surface.

To attach the snap-on clip 95, and thus the adapter clamp 14, to an arcuate surface such as 36 (FIGS. 2 and 3), the adapter 14 with each pair of opposed legs 96 placed astraddle the surface 36 is simply forced downwardly thereover, flexing the opposed cam surfaces 99 and shoulders 98 sufficiently apart to allow the shoulders 98 to pass beyond the edges of arcuate surface 36. In this connection, the pairs of opposed legs 96 are spaced longitudinally along the base and centered with respect thereto to straddle the strut 38 and assure centering of the adapter 14 on the arcuate surface 36. The resilient base member 66 extends longitudinally beyond each pair of legs 96 a predetermined distance so that as the clip is being attached to the arcuate surface 36, the lower surface 74 of opposite ends 68 and 70 comes into engagement with a portion of surface 36, resisting the downward force being applied thereto and, upon continued downward pressure, flexing upwardly and placing the clip 95 under the influence of an upward bias. Thus, as the shoulders 98 are forced beyond the edges of arcuate surface 36 they will snap back to their normal or natural position due to the resiliency of leg members 96 and, upon the downward pressure ending, will be urged upwardly into locking engagement with the underside of surface 36, securely attaching the adapter 14 thereto. If for any reason it should become necessary to remove the adapter, this may be accomplished by deflecting the legs 96 on one side of the base outwardly disengaging the shoulders from the underside of surface 36 and releasing the clip therefrom.

Snap-on clip 95 of the conduit holder 14 is designed to be easily adapted for attachment to arcuate surfaces of varying radii and thicknesses. Thus, it will be appreciated that by decreasing the length of the base member 66 on either side of the legs 96 while maintaining the spacing as shown between the surface 74 and shoulders 98, the clip would more readily conform to an arcuate surface of considerably smaller radius than that illustrated. Conversely, lengthening the base on either side of the legs would provide secure attachment to an arcuate surface of considerably larger radius than shown. Alternately, the same effect may be accomplished by maintaining the length of the base member as shown and either increasing or decreasing the spacing between the surface 74 and shoulders 98. The spacing between surface 74 and shoulders 98 also, of course, determines the range of thicknesses of support surfaces the snap-on clip may be attached to.

With reference to FIG. 2, the basic structure consisting of a plurality of modular units 10 and 12 of predetermined radius is assembled to support a bank of conduits 64 of given diameter in parallel, spaced relation, as hereinbefore described. When it is desired to use smaller diameter conduits such as shown at 80 in the same system, a plurality of adapter clamps 14 having the same diameter as the smaller conduit 80, are simply forced down into a snap-fitting engagement with the arcuate surfaces 36 of each intermediate unit 12 as needed. After a series of adapters are in place, i.e., longitudinally spaced along the intended path of installation, the conduit 80 is aligned with the open ends of the respective U-shaped body members 76 and forced downardly thereinto to provide a clamping arrangement therewith. Alternately, if so desired, the adapter clamps may be first snapped onto the conduit 80 and then forced into snap-fitting engagement with the arcuate surface 36.

The adapter clamp 14 may be made in a variety of sizes, i.e., diameters, to support conduits of different diameters and it is apparent that more than one size of adapter may be used in any one system, such as shown at 14' in FIG. 2.

It should be understood that although the snap-on clip 95 is illustrated and described in the preferred embodiment as having two pairs of opposed legs 96, one pair would suffice. Also, while the adapter is shown as being centrally located within respect to the arcuate surface 36, it is conceivable that it may be attached at any point on the surface. For that matter, it is possible to attach the adapter to the opposed arcuate surface 34 in a hanging, upside down orientation, if so desired. In this latter respect, and when installing a smaller diameter conduit in the system, the conduit is first disposed freely on the arcuate surfaces of a series of aligned, longitudinally spaced modules which can be either units 10 or 12. A like series of intermediate units 12, each having an adapter 14 secured to the upper surfaces 34 thereof, is then interconnected with respective support units 10 or 12. Finally, the conduit is pulled upwardly into the U-shaped body 76 and into clamping engagement therewith. This can be accomplished either after each intermediate unit is connected to its respective support unit or after the entire series thereof is in place.

It is to be understood that the forms of the invention herewith shown and described are to be taken as preferred embodiments of the same, and that various changes in the shape, size and arrangement of parts may be resorted to without departing from the spirit of the invention.

I claim:

1. A conduit holder comprising: a generally planar base; a generally U-shaped body connected to said base and having an open end extending away from said base; the exterior surfaces of said U-shaped body curving away from said base on either side of the connection to said base so as to define a space between said base and exterior surfaces providing for deflection of the ends of said planar base toward said U-shaped body; said body having a interior diameter approximately equal to the outside diameter of a conduit to be supported thereby; the open end of said U-shaped body terminating in a pair of opposed portions, the spacing between which is less than the outside diameter of said conduit, said U-shaped body being made of a resilient material to permit spreading of said opposed portions for receipt of said conduit into said body; and means connected to said base and extending away from said U-shaped body detachably securing said holder to an arcuate side member, said base, said U-shaped body and said securing means comprising an integral one piece structure formed of a resilient plastic material and said securing means comprising at least one pair of spaced opposed legs extending from opposite sides of said base; said legs having opposed inner wall surfaces formed with inwardly directed shoulders adapted for snap-fitted engagement astride and under said arcuate side member; said base extending longitudinally beyond said legs with at least the ends of said base adapted for engagement with said arcuate member, the distance between the innermost reach of said inwardly directed, opposed shoulders being less than the width of said arcuate side member, and the distance between said shoulders and said base being substantially greater than the thickness of said arcuate side member so as to accommodate arcuate side members having different degrees of curvature.

2. The conduit holder as defined in claim 1, wherein said base end portions are adapted to engage the top of said arcuate side member in opposed bearing relationship to said shoulders.

3. In a conduit system for supporting a plurality of conduits in parallel, spaced relationship: a frame member having a pair of opposed sides disposed in a common plane transverse to the axis of said conduit system, at least one of said sides including an arcuate surface having a diameter approximately equal to the outside diameter of a first conduit; an adapter for supporting a second conduit having a diameter smaller than said first conduit; said adapter including a generally planar base; a generally U-shaped body connected to said base and having an open end extending away from said base; the exterior surfaces of said U-shaped body curving away from said base on either side of the connection to said base so as to define a space between said base and exterior surfaces providing for deflection of the ends of said planar base toward said U-shaped body; said body having a interior diameter approximately equal to the outside diameter of said second conduit; the open end of said U-shaped body terminating in a pair of opposed portions, the spacing between which is less than the outside diameter of said second conduit; said U-shaped body being made of a resilient material to permit spreading of said opposed portions for receipt of said second conduit into said body; and means connected to said base and extending away from said U-shaped body for detachably securing said adapter to a portion of said side having said arcuate surface on said frame member, said securing means comprising at least one pair of spaced opposed legs extending from opposite sides of said base, said legs having opposed inner wall surfaces formed with inwardly directed shoulders adapted for snap-fitted engagement astride and under said side having said arcuate surface, said base extending longitudinally beyond said legs with at least the ends of said base in engagement with said arcuate surface, the distance between the innermost reach of said inwardly directed opposed shoulders being less than the width of said side having said arcuate surface, and the distance between said shoulders and said base being substantially greater than the thickness of said side having said arcuate surface.

4. A conduit support system as defined in claim 3, wherein said base, said U-shaped body and said securing means of said adapter are an integral one piece structure formed of a resilient plastic material.

5. A conduit support system as defined in claim 3, including a support strut affixed to said side having said arcuate surface opposite the location at which said adapter is detachably secured, said securing means comprising two pairs of said spaced opposed legs, said pairs being separated so that one of said pairs is adapted to be positioned on either side of said support strut for centering said adapter relative to said strut.

* * * * *